United States Patent [19]

Hata et al.

[11] Patent Number: 5,460,741
[45] Date of Patent: Oct. 24, 1995

[54] LUBRICATING OIL COMPOSITION

[75] Inventors: Hitoshi Hata, Ichihara; Toshiyuki Tsubouchi, Sodegaura; Hisashi Machida, Fujisawa, all of Japan

[73] Assignees: Idemitsu Kosan Co., Ltd.; NSK LTd., both of Tokyo, Japan

[21] Appl. No.: 225,314

[22] Filed: Apr. 8, 1994

[30] Foreign Application Priority Data

Apr. 9, 1993 [JP] Japan .................................. 5-083238

[51] Int. Cl.$^6$ ..................... C10M 133/00; C10M 133/56
[52] U.S. Cl. .................... 252/51.5 R; 252/50; 252/52 R; 252/56 R
[58] Field of Search ......................... 252/51.5 R, 51.5 A, 252/52 R, 50, 56 R; C10M 133/120

[56] References Cited

U.S. PATENT DOCUMENTS

| | | | |
|---|---|---|---|
| 4,867,890 | 9/1989 | Colclough et al. | 252/32.7 E |
| 5,091,099 | 2/1992 | Evans et al. | 252/48.6 |
| 5,167,844 | 12/1992 | Schumacher et al. | 252/32.7 R |

FOREIGN PATENT DOCUMENTS

| | | |
|---|---|---|
| 949956 | 6/1974 | Canada . |
| 0113157 | 7/1984 | European Pat. Off. . |
| 0208541 | 1/1987 | European Pat. Off. . |
| 0346283 | 12/1989 | European Pat. Off. . |
| 346283 | 12/1989 | European Pat. Off. . |
| 0454395 | 10/1991 | European Pat. Off. . |
| 2153893 | 5/1972 | Germany . |
| 2948020 | 6/1981 | Germany . |
| 2063909 | 6/1981 | United Kingdom . |

*Primary Examiner*—Prince Willis, Jr.
*Assistant Examiner*—Cephia Toomer
*Attorney, Agent, or Firm*—Antonelli, Terry, Stout & Kraus

[57] ABSTRACT

A lubricating oil composition is herein disclosed which comprises as the main compounds, (A) a base oil comprising a mineral oil or a synthetic oil; (B) a hindered phenol compound represented by the general formula (I) or (II)

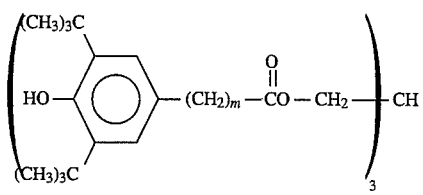

(I)

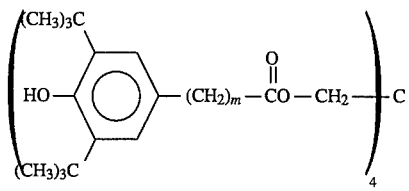

(II)

wherein m is an integer of 1 to 5; (C) an alkylated diphenylamine compound; and (D) a borated succinic acid imide compound. This lubricating oil composition is excellent in heat resistance and oxidation stability in a gaseous phase of the oil, and it stably functions for a long time as a traction drive oil or the like.

10 Claims, No Drawings

LUBRICATING OIL COMPOSITION

BACKGROUND OF THE INVENTION (1) Field of the Invention

The present invention relates to a lubricating oil composition, and more specifically, it relates to a lubricating oil composition which comprises as the main components, a base oil, a specific hindered phenol compound, a specific alkylated diphenylamine compound and a borated succinic acid imide compound, is excellent in heat resistance and oxidation stability, and stably functions for a long period of time particularly as a traction drive oil, a compressor oil or the like which is exposed to a high temperature in a mist-like state.

(2) Description of Related Art

In recent years, continuously variable transmissions (CVT) of traction drives for cars have shifted toward the increase in transmission power, the miniaturization of size and the freedom from maintenance. With this shift, a lubricating oil is required to have heat resistance and oxidation stability at a high temperature, and the level of these requirements is rising year by year.

Heretofore, research and development have been made mainly to secure the heat resistance and the oxidation stability at a high temperature in the so-called oily phase portion, and therefore the already developed lubricating oils can scarcely inhibit heat deterioration and oxidation deterioration in a gaseous phase portion.

SUMMARY OF THE INVENTION

Under such circumstances, the present inventors have intensively researched with the intention of developing a lubricating oil composition which can solve the above-mentioned conventional problems, can possess improved heat resistance in a gaseous phase portion and oxidation stability at a high temperature, and can stably function for a long period of time as a traction drive oil, a screw type or a rotary type compressor oil or the like. As a result, it has been found that the desired object of the present invention can be achieved by blending a base oil with a specific hindered phenol compound, a specific alkylated diphenylamine compound and a borated succinic acid imide compound. The present invention has now been completed on the basis of this knowledge.

That is to say, the present invention is directed to a lubricating oil composition comprising as the main compounds, (A) a base oil comprising a mineral oil, a synthetic oil or both the oils, (B) a hindered phenol compound represented by the general formula (I) or (II)

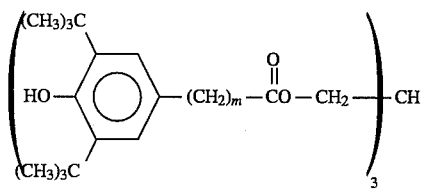

(I)

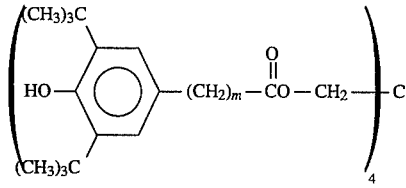

(II)

wherein m is an integer of 1 to 5, (C) an alkylated diphenylamine compound represented by the general formula (III)

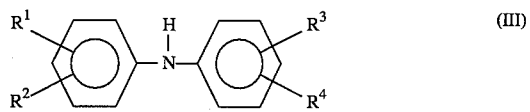

(III)

wherein $R^1$, $R^2$, $R^3$ and $R^4$ are each hydrogen or an alkyl group having 1 to 20 carbon atoms, provided that at least one of $R^1$ to $R^4$ is such an alkyl group, and (D) a borated succinic acid imide compound.

DETAILED DESCRIPTION OF PREFERRED EMBODIMENT

As a base oil constituting the component (A) of a lubricating oil composition of the present invention, any of various mineral oils and synthetic oils can be used. Furthermore, a combination of the mineral oil and the synthetic oil can also be used. Herein, as the mineral oils, various kinds of oils can be used, but naphthenic mineral oils are particularly preferable. In addition, similarly preferable are paraffinic mineral oils and intermediate mineral oils which have been refined by a nuclear hydrogenation-deep dewaxing treatment and is relatively rich in naphthenes. On the other hand, as the synthetic oils, various kinds of oils can be used, and examples of the synthetic oil include alicyclic hydrocarbons, fused alicyclic hydrocarbons, bridgehead alicyclic hydrocarbons, polybutene, polyolefins (poly-α-olefins and the like), esters such as polyol esters and dibasic acid esters, alkylbenzenes and phosphoric acid esters. Above all, naphthene ring-containing oils, polybutene and the like are preferable.

These preferable mineral oils and synthetic oils have advantages (1) that additives are easily soluble, (2) that carbon sludge generated in a system is soft and easily peelable, and (3) that a traction coefficient is high.

On the other hand, a hindered phenol compound which constitutes the component (B) of the lubrication oil according to the present invention is represented by the above-mentioned general formula (I) or (II). Alternatively, both the compounds represented by the general formulae (I) and (II), respectively can also be used together.

An alkylated diphenylamine compound which constitutes the component (C) of the lubricating oil composition of the present invention is represented by the above-mentioned general formula (III). In the general formula (III), each of $R^1$, $R^2$, $R^3$ and $R^4$ is hydrogen or an alkyl group having 1 to 20, preferably 3 to 12 carbon atoms, but at least one of $R^1$ to $R^4$ is such an alkyl group (i.e., excluding the case that all of $R^1$ to $R^4$ are simultaneously hydrogen). Examples of the component (C) include (1) a compound in which $R^1$ and $R^2$ are each an alkyl group having 3 to 9 carbon atoms (inclusive of a mixture of plural alkyl groups) and $R^3$ and $R^4$ are each hydrogen, (2) a compound in which $R^1$ to $R^3$ are each an alkyl group having 4 to 8 carbon atoms (inclusive of a mixture of plural alkyl groups) and $R^4$ is hydrogen, and (3) a compound in which only $R^1$ is an alkyl group having 6 to 12 carbon atoms (inclusive of a mixture of plural alkyl groups) and $R^2$ to $R^4$ are each hydrogen.

In the lubricating oil composition of the present invention, no particular restriction is put on amounts of the component (B) and the component (C). Thus, these amounts can be suitably selected in compliance with given situations, but in general, the amount of the component (B) is in the range of 0.2 to 2.0% by weight, preferably 0.5 to 1.5% by weight and that of the component (C) is in the range of 0.2 to 2.0% by weight, preferably 0.5 to 1.5% by weight based on the total weight of the composition. If the amount of the component (B) or the component (C) is too small, the desired object cannot be achieved, and conversely, even if it is too large, an additional effect corresponding to the increased amount cannot be observed.

Furthermore, no particular restriction is put on a blend ratio between the component (B) and the component (C), but it is preferable to set a weight ratio of the component (C) to the component (B) to 0.6–1.6, preferably 0.8–1.5. The component (B) and the component (C) are preferably added in the above-mentioned blend ratio, but the total ratio of both the components is selected in the range of 1.0–3.5% by weight, preferably 1.4 to 2.5% by weight.

Moreover, as a borated succinic acid imide compound which constitutes the component (D) of the lubricating oil composition of the present invention, various compounds can be used. Examples of the component (D) include (1) a reaction product obtained by reacting a succinic acid imide compound with a boron compound and (2) a reaction product obtained by reacting an amine compound with a boron compound, and then reacting with a succinic acid derivative.

The above-mentioned reaction product (1) can be obtained by reacting the succinic acid imide compound with the boron compound, but as this succinic acid imide compound, various compounds can be used. An example of the succinic acid imide compound can be prepared by reacting a polyalkylenepolyamine (an amine compound) with an alkenylsuccinic acid or its derivative (a succinic acid derivative).

Examples of the polyalkylenepolyamine which can be used in the preparation of this succinic acid imide compound include compounds where the alkylene groups are each ethylene, propylene, butylene or the like. Above all, its typical example is a polyethylenepolyamine in which the alkylene group is ethylene.

The polyethylenepolyamine is represented by the general formula (A)

$$NH_2[(CH_2)_2NH]_aH \qquad (A)$$

wherein a is an integer of 1 to 6, and it has n amino groups (however, n=a+1).

A typical example of the polyethylenepolyamine represented by the general formula (A) is tetraethylenepentamine corresponding to a=4. Other examples thereof include ethylenediamine, diethylenetriamine, triethylenetetramine and pentaethylenehexamine. Furthermore, examples of the polyalkylenepolyamine include polypropylenepolyamine and polybutylenepolyamine in addition to the above-mentioned polyethylenepolyamine.

These polyalkylenepolyamines can be used singly or in combination in an optional ratio.

Moreover, as the alkenylsuccinic acid or its derivative (e.g., an anhydride), various compounds can be used. For example, an alkenylsuccinic anhydride is practical in which an alkenyl moiety is a polymer of a monoolefin having 2 to 5 carbon atoms. Above all, a polyisobutenylsuccinic anhydride is particularly practical in which the alkenyl moiety is a polyisobutene (e.g., a polymer of a monoolefin having 4 carbon atoms) having a number-average molecular weight of 500 to 5,000, preferably 800 to 2,500. Examples of the other alkenyl moieties for the alkenylsuccinic acid and its derivative include a polymer of ethylene or propylene, and copolymers of ethylene and propylene as well as copolymers of isobutene and ethylene, propylene or a mixture thereof.

The alkenylsuccinic acid or its derivative, for example, the polyisobutenylsuccinic anhydride can be obtained by first adding 1 to 1.5 mols of maleic anhydride to 1 mol of polyisobutene, adding a catalyst, forming a maleate at 150°–280° C., deaerating under reduced pressure to remove unreacted maleic acid, adding diatomaceous earth, and then filtering the solution.

On the other hand, as the boron compound which can be reacted with the succinic acid imide compound, various compounds can be used. In general, the boron compound may be suitably selected for use from boric acid, borates and boric acid esters.

Furthermore, the amine compound, the boron compound and the succinic acid derivative for use in the preparation of the reaction product (2) can also be preferably selected from the above-mentioned compounds.

In the lubricating oil composition of the present invention, no particular restriction is put on the amount of the component (D). However, the amount of the component (D) is preferably in the range of 0.2 to 10.0% by weight, more preferably 0.2 to 5.0% by weight.

As described above, the lubricating oil composition of the present invention comprises the essential components (A) to (D), but various kinds of additives which have heretofore been used in the lubricating oil can be blended in suitable amounts, if necessary. Examples of such additives include an extreme pressure agent, a rust preventive, a detergent-dispersant, a viscosity index improver, a defoaming agent, a metal deactivator, an oilness agent, an antioxidant and an anti-wear agent. Examples of the extreme pressure agent include phosphoric acid ester compound such as tricresyl phosphate, a sulfur-containing compound such as olefin sulfide, zinc dithiophosphate (ZnDTP), molybdenum dithiophosphate (MoDTC) and molybdenum dithiocarbamate (MoDTC). Examples of the rust preventive include alkenylsuccinic acid esters and alkaline (earth) metal salts of sulfonic acid, and examples of the detergent-dispersant include sulfonates, phenates, salicylates, amides and imides. Examples of the viscosity index improver include polymethacrylate (PMA) and olefin copolymers (OCP) such as ethylene-propylene copolymer and styrenediene hydrogenated copolymers, and examples of the defoaming agent include silicone-based and alcohol-based compounds. In addition, examples of the metal deactivator include benzotriazole and alkylbenzotriazoles.

According to the present invention, the following functional effects can be obtained.

When the lubricating oil composition of the present invention which comprises the above-mentioned components is used, heat deterioration and oxidation deterioration in a gaseous phase portion of the oil can be inhibited, and the adhesion of a varnishy material to some portions of a device such as CVT and the formation of a sludge in the oil can be effectively inhibited. Therefore, the composition can be suitably used in a device to be lubricated thereby in a mist-like state under high-temperature circumstances at 120° C. or higher. In particular, the composition can be effectively utilized as a traction drive oil (a traction drive fluid), a compressor oil for screw type and rotary type compressors, and the like.

Next, the present invention will be described in more detail with reference to examples and comparative examples.

EXAMPLES 1 to 7, AND COMPARATIVE EXAMPLES 1 TO 7

For lubricating oil compositions shown in Table 1, oxidation stability in a gaseous phase portion and oxidation stability in an oily phase portion were measured by the following procedure. The results are shown in Table 1.

Procedure of Test

A test was made in accordance with Testing Method for Thermal Stability of Lubricating Oils in JIS K 2540.

Specifically, 20 g of an oil was placed in a prescribed glass container, and a copper wire (1.6 mm diameter ×10 cm length) prescribed in Testing Method for Oxidation Stability of Turbine Oil in Paragraph 3.2 of Testing Methods for Oxidation Stability of Lubricating Oils in JIS K 2514 was immersed in the oil. Afterward, the container was then covered with an aluminum foil (which was a commercially available aluminum foil washed with n-hexane).

Next, the oil was heated up to 170° C. and then taken out every 12 hours to visually observe a gaseous phase portion and an oily phase portion, and the oxidation stability in the gaseous phase portion and the oxidation stability in the oily phase portion were evaluated on the basis of times taken for the adhesion of a varnishy material and the precipitation of an oil-insoluble material, respectively were observed.

Oxidation stability in the gaseous phase portion:

(i) A taken for the adhesion of the varnishy material on the gaseous phase portion of the glass container was observed [the stability in the gaseous phase portion (i)].

(ii) A time taken for the adhesion of the varnishy material on the aluminum foil was observed [the stability in the gaseous phase portion (ii)].

Oxidation stability in the oily phase portion:

A time taken for the precipitation of the sludge (the oil-insoluble material) in the oil was observed.

Evaluation

When any one of the above-mentioned three items regarding the adhesion of the varnishy material and the precipitation of the sludge was observed, this required time was regarded as an evaluation time. The evaluation was based on that the longer this time was, the better the characteristics were.

In this connection, the visual observation was discontinued after an elapse of time of 144 hours.

TABLE 1

| | | Example 1 | Example 2 | Example 3 | Example 4 | Example 5 | Example 6 | Example 7 | Comp. Example 1 |
|---|---|---|---|---|---|---|---|---|---|
| COMPOSITION OF COMPONENTS (wt %) | | | | | | | | | |
| Base oil | Synthetic oil (a) | Balance | Balance | Balance | Balance | Balance | Balance | Balance | Balance |
| Hindered | Compound (b) | 1.0 | 1.0 | 1.0 | 0.7 | 0.5 | 0.6 | 1.5 | 0.6 |
| phenol | Compound (c) | — | — | — | — | — | — | — | — |
| compound | Compound (d) | — | — | — | — | — | — | — | — |
| | Compound (e) | — | — | — | — | — | — | — | — |
| Amine compound | Alkylated diphenylamine (f) | 1.0 | 0.6 | 1.5 | 0.5 | 0.8 | 0.6 | 1.5 | 0.3 |
| | Alkylated pheny-α-naphthylamine (g) | — | — | — | — | — | — | — | — |
| Boron-based succinic acid imide compound (h) | | 2.5 | 2.5 | 2.5 | 2.5 | 2.5 | 2.5 | 2.5 | 2.5 |
| Additives | Viscosity index improver (i) | 3.0 | 3.0 | 3.0 | 3.0 | 3.0 | 3.0 | 3.0 | 3.0 |
| | Extreme pressure agent (j) | 0.5 | 0.5 | 0.5 | 0.5 | 0.5 | 0.5 | 0.5 | 0.5 |
| | Rust preventive (k) | 0.05 | 0.05 | 0.05 | 0.05 | 0.05 | 0.05 | 0.05 | 0.05 |
| | Defoaming agent (l) | 0.001 | 0.001 | 0.001 | 0.001 | 0.001 | 0.001 | 0.001 | 0.001 |
| RESULTS | | | | | | | | | |
| Oxidation stability in gaseous phase portion | Stability in gaseous phase portion (i) (hrs) | 144< | 120 | 144< | 84 | 96 | 96 | 144< | 48 |
| | Stability in gaseous phase portion (ii) (hrs) | 144< | 120 | 144< | 96 | 96 | 96 | 144< | 48 |
| Oxidation stability in oily phase portion (hrs) | | 144< | 144 | 144< | 120 | 144< | 120 | 144 | 60 |

| | | Comp. Example 2 | Comp. Example 3 | Comp. Example 4 | Comp. Example 5 | Comp. Example 6 | Comp. Example 7 |
|---|---|---|---|---|---|---|---|
| COMPOSITION OF COMPONENTS (wt %) | | | | | | | |
| Base oil | Synthetic oil (a) | Balance | Balance | Balance | Balance | Balance | Balance |
| Hindered | Compound (b) | 0.3 | 1.0 | — | — | 1.0 | — |
| phenol | Compound (c) | — | — | 1.0 | — | — | — |

TABLE 1-continued

| | | | | | | | |
|---|---|---|---|---|---|---|---|
| compound | Compound (d) | — | — | — | 1.0 | — | — |
| | Compound (e) | — | — | — | — | — | 1.0 |
| Amine compound | Alkylated diphenylamine (f) | 0.6 | — | 1.0 | 1.0 | 1.0 | 1.0 |
| | Alkylated pheny-α-naphthylamine (g) | — | 1.0 | — | — | — | — |
| Boron-based succinic acid imide compound (h) | | 2.5 | 2.5 | 2.5 | 2.5 | — | 2.5 |
| Additives | Viscosity index improver (i) | 3.0 | 3.0 | 3.0 | 3.0 | 3.0 | 3.0 |
| | Extreme pressure agent (j) | 0.5 | 0.5 | 0.5 | 0.5 | 0.5 | 0.5 |
| | Rust preventive (k) | 0.05 | 0.05 | 0.05 | 0.05 | 0.05 | 0.05 |
| | Defoaming agent (l) | 0.001 | 0.001 | 0.001 | 0.001 | 0.001 | 0.001 |
| RESULTS | | | | | | | |
| Oxidation stability in gaseous phase portion | Stability in gaseous phase portion (i) (hrs) | 48 | 60 | 48 | 48 | 48 | 48 |
| | Stability in gaseous phase portion (ii) (hrs) | 24 | 48 | 48 | 48 | 48 | 48 |
| Oxidation stability in oily phase portion (hrs) | | 48 | 60 | 60 | 60 | 60 | 60 |

Synthetic oil (a): A compound represented by the formula:

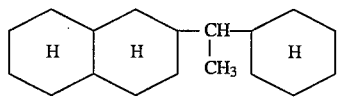

Compound (b): A compound (Mw=1178) represented by the formula:

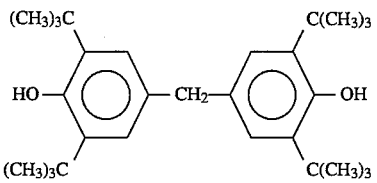

Compound (d): A compound (Mw=639) represented by the formula:

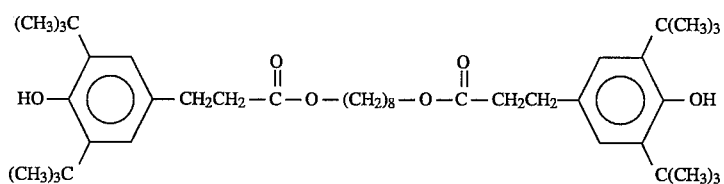

Compound (e): A compound represented by the formula:

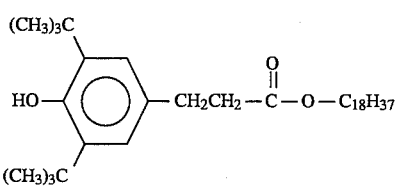

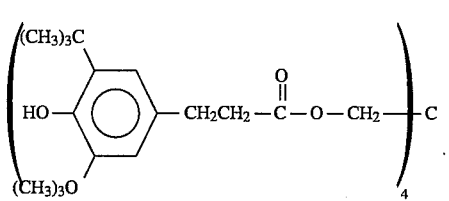

Compound (c): A compound (Mw=420) represented by the formula:

Alkylated diphenylamine (f): An alkylated diphenylamine mixture containing, as the main component, a compound (an alkyl group was a combination of at least two groups of a butyl group to an octyl group) represented by the formula:

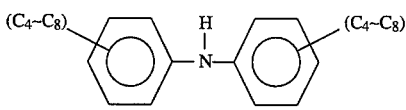

Alkylated phenyl-α-naphthylamine (g): A compound represented by the formula:

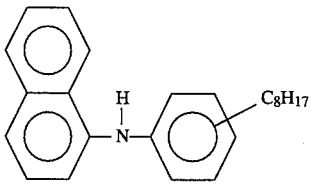

Borated succinic acid imide compound (h): A borated succinic acid imide replaced with a polyisobutenyl group having a molecular weight of about 2,000.

Viscosity index improver (i): Polymethacrylate (Mw: about 36000).

Extreme pressure agent (j): Tricresyl phosphate.

Rust preventive (k): Alkenyl succinic acid half ester.

Defoaming agent (l): Dimethylsiloxane.

What is claimed is:

1. A lubricating oil composition which comprises as the main components, (A) a base oil comprising at least one of a mineral oil and a synthetic oil, selected from the group consisting of alicyclic hydrocarbons, fused alicyclic hydrocarbons, bridgehead alicyclic hydrocarbons, polybutene and naphthene ring-containing oils, (B) a hindered phenol compound represented by the general formula (I) or (II)

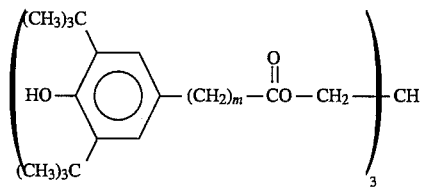

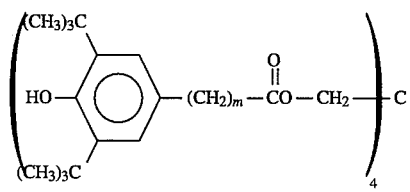

wherein m is an integer of 1 to 5, (C) an alkylated diphenylamine compound represented by the general formula (III)

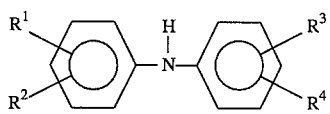

wherein $R^1$, $R^2$, $R^3$ and $R^4$ are each hydrogen or an alkyl group having 1 to 20 carbon atoms, provided that at least one of $R^1$ to $R^4$ is such an alkyl group, and (D) a borated succinic acid imide compound; the amount of the hindered phenol compound (B) being in the range of 0.2 to 2.0% by weight, the amount of the alkylated diphenylamine compound (C) being in the range of 0.2 to 2.0% by weight and the amount of the borated succinic acid imide compound (D) being in the range of 0.2 to 10.0% by weight and a compounding ratio by weight of the alkylated diphenylamine compound (C) to the hindered phenol compound (B) being in the range of 0.6 to 1.6.

2. The lubricating oil composition according to claim 1 wherein the total amount of the hindered phenol compound (B) and the alkylated diphenylamine compound (C) is in the range of 1.0 to 3.5% by weight.

3. The lubricating oil composition according to claim 1 wherein the base oil (A) is at least one member selected from the group consisting of a naphthenic mineral oil, a naphthene ring-containing oil and polybutene.

4. The lubricating oil composition according to claim 1 wherein the alkylated diphenylamine compound (C) is a compound represented by the general formula (III) in which $R^1$ and $R^2$ are each an alkyl group having 3 to 9 carbon atoms and $R^3$ and $R^4$ are each hydrogen.

5. The lubricating oil composition according to claim 1 wherein the alkylated diphenylamine compound (C) is a compound represented by the general formula (III) in which $R^1$ to $R^3$ are each an alkyl group having 4 to 8 carbon atoms and $R^4$ is hydrogen.

6. The lubricating oil composition according to claim 1 wherein the alkylated diphenylamine compound (C) is a compound represented by the general formula (III) in which only $R^1$ is an alkyl group having 6 to 12 carbon atoms and $R^2$ to $R^4$ are each hydrogen.

7. The lubricating oil composition according to claim 1 wherein the alkylated diphenylamine compound (C) is a compound represented by the general formula (III) in which $R^1$ and $R^3$ are each an alkyl group having 4 to 8 carbon atoms, and $R^2$ and $R^4$ are each hydrogen.

8. The lubricating oil composition according to claim 1 wherein the borated succinic acid imide compound (D) is a reaction product obtained by reacting a succinic acid imide compound with a boron compound.

9. The lubricating oil composition according to claim 1 wherein the borated succinic acid imide compound (D) is a reaction product obtained by reacting an amine compound with a boron compound, and then reacting with a succinic acid derivative.

10. A traction drive fluid comprising the lubricating oil composition as set forth in claim 1.

* * * * *